July 23, 1935.  H. GRIEBAT  2,008,954

TRACTOR LUG

Filed Feb. 4, 1935

INVENTOR
H. Griebat
BY
ATTORNEY

Patented July 23, 1935

2,008,954

UNITED STATES PATENT OFFICE 2,008,954

TRACTOR LUG

Herman Griebat, Lodi, Calif.

Application February 4, 1935, Serial No. 4,832

4 Claims. (Cl. 301—44)

This invention relates to tractor lugs attached to the rim of a tractor wheel in order to increase the traction. The device hereinafter disclosed is of the same general type, but is an improvement over, the tractor lug disclosed in my United States Patent No. 1,892,945, such improvement being in respect to the flexible mounting of the lug on the tractor wheel.

The principal object of this invention is, as in the previous device, to provide a self-cleaning tractor lug constructed in such a manner that the lug will flex relative to the rim of the wheel as the lug pulls out of the ground, thereby freeing the dirt from about the lug and permitting the lug to be relatively clean when it again enters the ground. In this manner the traction of the implement is greatly increased.

An additional object of the present invention however is to provide a soft riding tractor lug which is mounted in flexible relation with the rim of the tractor wheel but which is secured in place on said rim by certain means having rigid and non-flexible connection with the rim. I thus provide a soft riding tractor lug which may flex relative to the rim and yet prevent such flexing motion from loosening or wearing out the means securing the lug to the rim.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar character of reference indicate corresponding parts in the several views.

Figure 1:
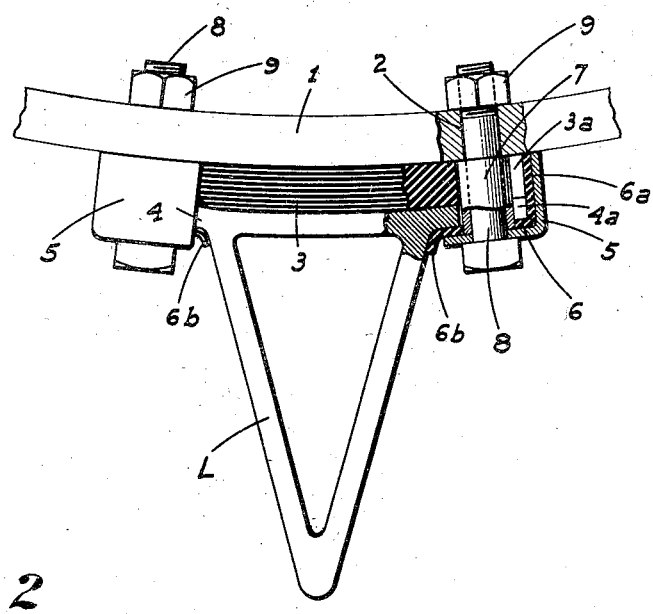
Figure 1 is a side elevation partially in section, illustrating the lug as attached to the rim of a tractor wheel.
Figure 2:
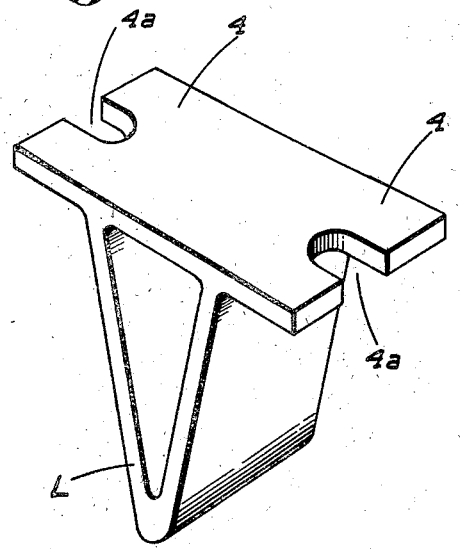
Figure 2 is a perspective view of the lug.
Figure 3:
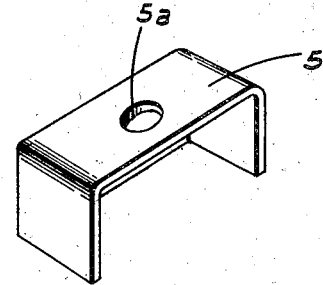
Figure 3 is a persepective view of the securing cap for the flanges of the lug.

Referring now more particularly to the characters of reference in the drawing, the numeral 1 denotes the rim of the tractor wheel formed with spaced bolt holes 2.

A substantially rectangular resilient pad 3, preferably made of thick rubber, engages the outer face of the rim and is provided with openings 3a in each end thereof to register with the bolt holes 2 but of somewhat greater size for the purpose as will hereinafter appear.

Engaging the outer surface of the resilient pad 3 are the base flanges 4 which project outwardly from the tapered or V-shaped lug L. These flanges are formed with openings 4a which register with the openings 3a in the pad 3 and which are of substantially the same size.

Encasing each flange 4 and adjacent portion of the resilient pad 3 is a rigid cap 5 open only on two sides as shown and having a bolt hole 5a of the same diameter as the bolt hole 2 and in axial alinement therewith. Disposed between the cap 5 and the flange 4 is a relatively thin sheet of resilient material 6 which extends about the end of the flange and pad down to the rim, as at 6a. The other end of this resilient sheet 6 extends up between the inner edge of the cap and the face of the lug, as at 6b.

A spacing tube 7 extends between and engages the rim 1 and the cap 5 through the openings 3a and 4a respectively in the pad 3 and flange 4.

A bolt 8 extends through the cap 5 down through the spacing tube 7 and then projects through the rim and is secured in place by a suitable nut 9.

By means of this arrangement of parts the cap is rigidly held in place on the rim by the spacing tube and bolt while at the same time the lug L is held in place on the rim but can flex relative thereto due to the fact that there is a non-compressed resilient element on both sides as well as on the end of the flange.

The openings 4a in the flange are of course slightly larger in diameter than the spacing tubes 7 in order that as the lug moves or flexes the flanges may move relative to the tubes without twisting or damaging the same.

The openings 3a in the pad are also made larger than the diameter of the tube in order to facilitate assembly of the lug structure.

In operation, the lug, mounted as heretofore described, will flex each time it is pulled out of the ground. This flexing movement of the lug relative to the rim of the wheel loosens the dirt about the base of the lug and shakes the dirt free of the lug. Then when the lug again enters the ground it is substantially free of dirt and the traction is greatly increased.

Also, in use the lug will flex relative to the rim of the tractor wheel whenever the tractor is operating on hard ground or the lug strikes a hard object thereby eliminating the heavy shock to tractor and driver which would otherwise occur. This flexing movement may be in a direction towards the rim, the pad acting as the shock absorber or the lug may tilt forward or backward or to the side depending on the object encountered by the lug. With such movement, the cap, tube and bolt cannot shift nor wear, thereby providing an effective means of securing the lug to the rim.

The end of the resilient sheet 6 extending out as at 6a not only forms a cushion between the edge of the cap and the face of the lug, but also prevents dirt from getting under the cap at that point.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with a wheel rim, a traction lug therefor, base flanges on the lug, a resilient pad between the rim and flanges and on which the latter rest, said flanges and pad having openings therethrough, bolts projecting through the openings and secured to the rim, and means to hold said bolts immovably in place without interfering with relative movement of the flanges and lug in a direction radially of the wheel.

2. In combination with a wheel rim, a traction lug therefor, base flanges on the lug, a resilient pad between the rim and flanges and on which the latter rest, said flanges and pad having openings therethrough, rigid orificed caps bearing on the rim and extending over the flanges, and bolts extending through the cap orifices and the flange and pad openings and into the rim to clamp the caps against the rim and prevent lateral and outward displacement of the lug flanges.

3. A structure as in claim 2, with spacers about the bolts and extending between and engaging the adjacent faces of the rim and caps.

4. A structure as in claim 2, with strips of resilient material extending about the ends and outer faces of the flanges and confined within the caps.

HERMAN GRIEBAT.